US011956175B1

(12) United States Patent
Brouillette

(10) Patent No.: US 11,956,175 B1
(45) Date of Patent: Apr. 9, 2024

(54) HUB STATION WITH CHANNEL SWITCHING FEATURE

(71) Applicant: Roku, Inc., San Jose, CA (US)

(72) Inventor: Patrick A. Brouillette, Tempe, AZ (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/363,550

(22) Filed: Aug. 1, 2023

(51) Int. Cl.
*H04L 5/00* (2006.01)
*H04L 43/0876* (2022.01)

(52) U.S. Cl.
CPC .......... *H04L 5/0064* (2013.01); *H04L 5/0055* (2013.01); *H04L 5/0096* (2013.01); *H04L 43/0876* (2013.01)

(58) Field of Classification Search
CPC ... H04L 5/0064; H04L 5/0055; H04L 5/0096; H04L 43/0876
USPC .......................................................... 370/330
See application file for complete search history.

(56) References Cited

U.S. PATENT DOCUMENTS

| | | | | | |
|---|---|---|---|---|---|
| 2002/0077110 | A1* | 6/2002 | Ishikawa | ................ | H04W 28/20 455/452.2 |
| 2004/0240422 | A1* | 12/2004 | Kim | ...................... | H04W 74/08 370/332 |
| 2006/0224763 | A1* | 10/2006 | Altunbasak | ........... | H04W 88/06 709/231 |
| 2009/0193482 | A1* | 7/2009 | White | ................ | H04N 21/6338 725/110 |
| 2009/0209280 | A1* | 8/2009 | Kawaguchi | ............. | H04W 8/30 455/436 |
| 2009/0262709 | A1* | 10/2009 | Mason | .................. | H04W 36/06 370/336 |
| 2018/0234970 | A1* | 8/2018 | Hall | .................. | H04W 72/0453 |

\* cited by examiner

*Primary Examiner* — Mang Hang Yeung
(74) *Attorney, Agent, or Firm* — McDonnell Boehnen Hulbert & Berghoff LLP

(57) ABSTRACT

In one aspect, an example method includes monitoring, by a hub station, a first channel activity level associated with a first channel of a plurality of channels within a particular frequency range. The hub station communicates with a low-energy device using the first channel. The method includes determining that the first channel activity level satisfies a threshold activity level and switching to a second channel of the plurality of channels to communicate with the low-energy device. The method includes notifying the low-energy device that the hub station switched to the second channel by sending an acknowledgement message to the low-energy device on the second channel in response to receiving a message from the low-energy device on the second channel. The message is sent to the hub station on the second channel after at least one unsuccessful attempt to send the message to the hub station on the first channel.

20 Claims, 7 Drawing Sheets

HUB STATION WITH CHANNEL SWITCHING FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes monitoring, by a hub station, a first channel activity level associated with a first channel of a plurality of channels within a particular frequency range. The hub station communicates with a low-energy device using the first channel. The method also includes determining, by the hub station, that the first channel activity level satisfies a threshold activity level. The method also includes switching, by the hub station, to a second channel of the plurality of channels to communicate with the low-energy device, at least in part, in response to determining that the first channel activity level satisfies the threshold activity level. The method also includes notifying the low-energy device that the hub station switched to the second channel by sending an acknowledgement message to the low-energy device on the second channel in response to receiving a message from the low-energy device on the second channel. The message is sent to the hub station on the second channel after at least one unsuccessful attempt to send the message to the hub station on the first channel.

In another aspect, an example hub station is disclosed. The hub station includes a memory and a processor coupled to the memory. The processor is configured to monitor a first channel activity level associated with a first channel of a plurality of channels within a particular frequency range. The hub station communicates with a low-energy device using the first channel. The processor is also configured to determine that the first channel activity level satisfies a threshold activity level. The processor is also configured to switch to a second channel of the plurality of channels to communicate with the low-energy device, at least in part, in response to determining that the first channel activity level satisfies the threshold activity level. The processor is also configured to notify the low-energy device that the hub station switched to the second channel by sending an acknowledgement message to the low-energy device on the second channel in response to receiving a message from the low-energy device on the second channel. The message is sent to the hub station on the second channel after at least one unsuccessful attempt to send the message to the hub station on the first channel.

In another aspect, an example non-transitory computer-readable medium is disclosed. The computer-readable medium has stored thereon instructions that, upon execution by a processor within a hub station, cause the processor to perform operations. The operations include monitoring a first channel activity level associated with a first channel of a plurality of channels within a particular frequency range. The hub station communicates with a low-energy device using the first channel. The operations also include determining that the first channel activity level satisfies a threshold activity level. The operations also include switching to a second channel of the plurality of channels to communicate with the low-energy device, at least in part, in response to determining that the first channel activity level satisfies the threshold activity level. The operations also include notifying the low-energy device that the hub station switched to the second channel by sending an acknowledgement message to the low-energy device on the second channel in response to receiving a message from the low-energy device on the second channel. The message is sent to the hub station on the second channel after at least one unsuccessful attempt to send the message to the hub station on the first channel.

DETAILED DESCRIPTION

I. Overview

Figure 1:
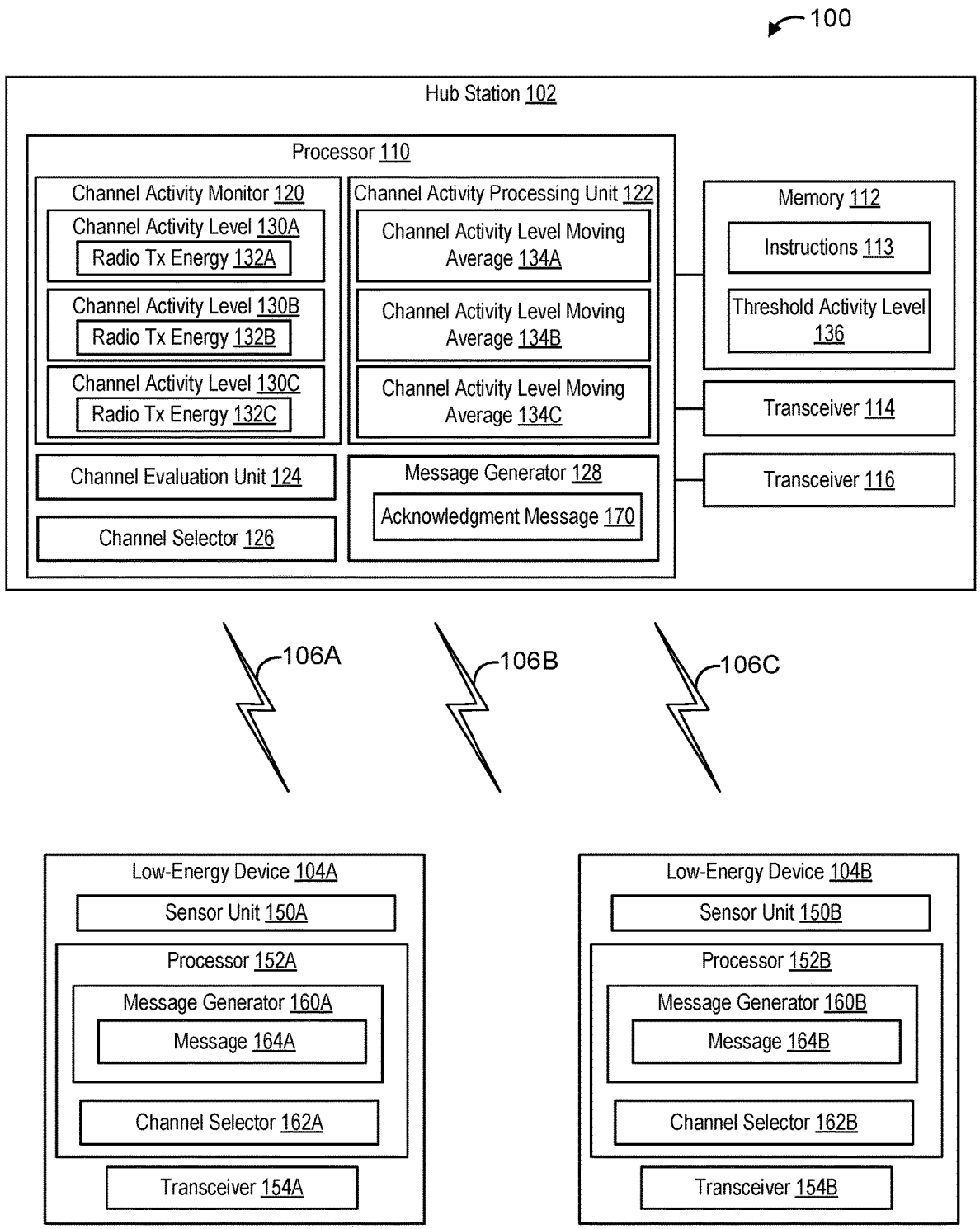
FIG. 1 is a simplified block diagram of an example communication system in which various described principles can be implemented.

A hub station can communicate with a plurality of low-energy devices using channels (e.g., frequencies) within a particular frequency range. For example, when the hub station and a particular low-energy device are tuned to a first channel within the particular frequency range, the hub station can send data to the particular low-energy device over the first channel, and the hub station can receive data from the particular low-energy device over the first channel.

If a transmission energy level associated with the first channel is relatively high, possibly indicating a relatively large amount of jamming activity, the hub station can switch to a second channel within the particular frequency range. To illustrate, the hub station can monitor the transmission energy level on each channel within the particular frequency range. In response to a determination that second channel has a lower transmission energy level than the transmission energy level associated with the first channel, the hub station can tune a transceiver (e.g., a radio) to the second channel. After the hub station switches to the second channel, the particular low-energy device is not immediately notified of the switch. Thus, the particular low-energy device remains tuned to the first channel.

In response to an event (e.g., a wake-up event) at the particular low-energy device, the particular low-energy device can attempt to send a message to the hub station over the first channel. To illustrate, if the particular low-energy device is a motion sensor, in response to detecting motion, the particular low-energy device can attempt to send the message (indicating the detected motion) to the hub station over the first channel. However, because the hub station switched to the second channel, the hub station does not receive the message from the particular low-energy device and does not send an acknowledgment message to the particular low-energy device over the first channel.

After one or more unsuccessful attempts to send the message to the hub station over the first channel, the particular low-energy device can switch to another channel. As used herein, an "unsuccessful attempt" to send the message occurs when an acknowledgment message is not received in response to sending the message. If the particular low-energy device switches to the second channel and sends the message to the hub station over the second channel, the hub station sends an acknowledgment message to the particular low-energy device. Upon receiving the acknowledgment message, the particular low-energy device is put on notice that the hub station has switched to the second channel. As a result, the particular low-energy device uses the second channel to send all message to the hub station until another attempt to send a message is unsuccessful, indicating that the hub station has again switched channels.

The techniques described herein can help reduce power consumption at the particular low-energy device. For example, the particular low-energy device can remain in a low-energy mode for prolonged periods of time (e.g., until the occurrence of a wake-up event) because the particular low-energy device does not have to "listen" on the first channel for the switching notification messages from the hub station. By waiting until the occurrence of a wake-up event to "find" the hub station, the particular low-energy device can remain in a low-energy mode for prolonged periods of time, thus conserving battery power.

Below, particular embodiments are described herein with reference to the drawings. In the description, common features are designated by common reference numbers throughout the drawings. In some figures, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple channels are illustrated and associated with reference numbers 106A, 106B, etc. When referring to a particular one of these channels, such as the channel 106A, the distinguishing letter "A" is used. However, when referring to any arbitrary one of these channels or to these channels as a group, the reference number 106 is used without a distinguishing letter.

II. Example Communication System

FIG. 1 is a block diagram of an example communication system 100. The communication system 100 includes a hub station 102 and a plurality of low-energy devices 104. For example, the communication system 100 includes a low-energy device 104A and a low-energy device 104B. Although two low-energy devices 104 are illustrated in FIG. 1, in other implementations, the communication system 100 can include additional (or fewer) low-energy devices. For example, in one implementation, the communication system 100 can include a single low-energy device 104, such as the low-energy device 104A. However, in another implementation, the communication system 100 can include five low-energy devices 104.

The hub station 102 corresponds to a central transmitting and receiving device of a network. For example, the hub station 102 can be associated with a plurality of peripheral devices, such as the low-energy devices 104, within a particular network. Data transmitted from the peripheral devices in the particular network is typically transmitted to the hub station 102. In some implementations, the hub station 102 can serve as a gateway device for peripheral devices to communicate with other peripheral devices or with a device outside of the particular network.

The hub station 102 includes a processor 110, a memory 112 coupled to the processor 110, a transceiver 114 coupled to the processor 110, and a transceiver 116 coupled to the processor 110. Although transceivers 114, 116 are depicted, in some implementations, one or more of the transceivers 114, 116 can be replaced with a separate receiver and a transmitter. The memory 112 can correspond to a non-transitory computer-readable medium that stores instructions 113 executable by the processor 110 to perform the operations described herein.

Each transceiver 114, 116 in the hub station 102 can be tuned to a different frequency (e.g., a different channel). To illustrate, the transceiver 114 can be tuned to communicate data using a channel within a first frequency range (e.g., a lower frequency range), and the transceiver 116 can be tuned to communicate data using a channel within a second frequency range (e.g., a higher frequency range). As a non-limiting example, the transceiver 114 can be tuned to send and receive data (e.g., data packets) using a frequency channel below 1 Gigahertz (GHz), and the transceiver 116 can be tuned to send and receive data using a frequency channel associated with an Institute of Electrical and Electronics Engineers (IEEE) 802.11 ("Wifi") protocol. Thus, the hub station 102 can include at least two radios (e.g., a first radio for the transceiver 114 and a second radio for the transceiver 116) to communicate data over different frequency ranges. According to one implementation, the transceiver 114 can be tuned to send and receive data using a 900 Megahertz (MHz) frequency and/or frequencies relatively close to 900 MHz. It should be understood that the above frequency ranges for the transceiver 114 are merely for illustrative purposes and should not be construed as limiting. The techniques described herein can be applied to the transceiver 114 if the transceiver 114 is tuned to send and receive data using frequencies range above 1 GHz, as well.

The hub station 102 can communicate with the low-energy devices 104 using channels 106 (e.g., frequency channels) within a particular frequency range. As used herein, the "particular frequency range" can span from 900 MHz to 1 GHz; however, it should be understood that in other implementations, the particular frequency range can include frequencies above 1 GHz and/or frequencies below 900 MHz. In the illustration of FIG. 1, the transceiver 114 of the hub station 102 can be tuned to communicate with the low-energy devices 104 using a channel 106A, a channel 106B, or a channel 106C. According to one implementation, the channel 106A can correspond to a primary channel that has a higher compatibility rating, associated with communications between the hub station 102 and the low-energy devices 104, than the other channels 106B, 106C. Although three channels 106A, 106B, 106C are illustrated in FIG. 1, in other implementations, the system 100 can include additional channels 106.

The processor 110 includes a channel activity monitor 120, a channel activity processing unit 122, a channel evaluation unit 124, a channel selector 126, and a message generator 128. In some implementations, one or more components 120, 122, 124, 126, 128 of the processor 110 can be implemented using dedicated circuitry, such as an application-specific integrated circuit (ASIC) or a field-programmable gate array (FPGA) device. In some implementations, operations associated with one or more components 120, 122, 124, 126, 128 of the processor 110 can be performed by executing the instructions 113 stored in the memory 112. In some implementations, two or more of the components 120, 122, 124, 126, 128 of the processor 110 can be integrated into a single component. As a non-limiting example, the channel activity monitor 120 and the channel activity processing unit 122 can be integrated into a single component (e.g., a single unit or module).

The techniques described herein enable the hub station 102 to monitor activity (e.g., jamming activity or noise) on the channels 106 and select a particular channel 106 for communication with the low-energy devices 104 based on the activity. For example, at a given point in time, the transceiver 114 can be tuned to communicate with the low-energy devices 104 using the primary channel 106A. While tuned to communicate with the low-energy devices 104 using the channel 106A, the transceiver 114 can switch frequencies every clock period to enable the processor 110 to monitor channel activity levels 130 associated with each channel 106. Based on the channel activity levels 130 associated with the each channel 106, the processor 110 can select a channel 106 for communicating with the low-energy devices 104. For example, based on the channel activity levels 130 associated with each channel 106, the processor 110 can select to remain on the primary channel 106A or select to switch to one of the secondary channels 106B, 106C.

To illustrate, the channel activity monitor 120 can be configured to monitor a channel activity level 130A associated with the channel 106A, a channel activity level 130B associated with the channel 106B, and a channel activity level 130C associated with the channel 106C. As a non-limiting example, each clock period can correspond to one second. During a first interval (e.g., a fifty millisecond (ms) interval) of a clock period, the transceiver 114 can switch to the channel 106B, and the channel activity monitor 120 can monitor (e.g., measure) the channel activity level 130A associated with the channel 106A during the first interval. During a second interval of the clock period, the transceiver 114 can switch to the channel 106C, and the channel activity monitor 120 can monitor the channel activity level 130B associated with the channel 106B during the second interval. During a third interval of the clock period, the transceiver 114 can switch back to the channel 106A, and the channel activity monitor 120 can monitor the channel activity level 130A associated with the channel 106A during the third interval. The remaining portion of the clock period can be used to communicate with the low-energy devices 104 using the active (e.g., currently selected) channel 106 (e.g., the channel 106A).

It should be understood that the duration of the clock period and the duration of the intervals are merely for illustrative purposes and should not be construed as limiting. In other implementations, the clock period can have a longer or shorter duration. Additionally, in other implementations, the time intervals for monitoring channel activity levels 130 on each channel 106 can have a longer or shorter duration than the 50 ms duration described above. In some implementations, the first interval, the second interval, and the third interval can be consecutive time intervals within the clock period. In other implementations, the first interval, the second interval, and the third interval can be non-consecutive time intervals within the clock period such that the transceiver 114 can communicate with the low-energy devices 104 using the active channel 106 between the intervals for monitoring channel activity levels 130. In these implementations, the transceiver 114 can be configured to switch back to the active channel 106A after monitoring the channel activity level 130 on a non-active channel 106.

The hub station 102 can be configured to monitor a channel activity level 130 for a single channel at any given point in time. For example, if the hub station 102 monitors the channel activity level 130A associated with the channel 106A, the channel activity levels 130B, 130C associated with the other channels 106B, 106C are unmonitored by the hub station 102.

In some implementations, the channel activity level 130A can correspond to a radio transmission (Tx) energy 132A on the channel 106A, the channel activity level 130B can correspond to a radio transmission energy 132B on the channel 106B, and the channel activity level 130C can correspond to a radio transmission energy 132C on the channel 106C. The radio transmission energy 132 for a particular channel 106 can be based on transmission activity on the channel 106. To illustrate, if data is transmitted on a particular channel 106, a magnitude of the radio transmission energy 132 for the particular channel 106 increases. Thus, the radio transmission energy 132 for a particular channel 106 correlates to jamming activity on the channel 106. Monitoring the radio transmission energy 132 on each channel 106 is described in greater detail with respect to FIG. 3.

In some implementations, the channel activity processing unit 122 can be configured to determine a moving average of channel activity levels 134 on each channel 106. For example, at a particular instance of time, data can be transmitted on an otherwise relatively "quiet" channel. By determining the moving average of channel activity levels 134 on each channel 106, the processor 110 can determine whether there is substantially continuous jamming activity on the channel or whether there was isolated activity on an otherwise quiet channel.

To illustrate, the channel activity processing unit 122 can determine (e.g., compute) a channel activity level moving average 134A for the channel 106A, a channel activity level moving average 134B for the channel 106B, and a channel activity level moving average 134C for the channel 106C. In some implementations, the channel activity level moving averages 134 can be based on channel actively level 130 measurements for five consecutive clock cycles. For example, to determine the channel activity moving average 134A for the channel 106A, the channel activity processing unit 122 can determine an average of the last five channel activity level 130A measurements associated with the channel 106A. Determining the channel activity level moving average 134 is described in greater detail below with respect to FIG. 3. It should be understood that basing the channel activity level moving average 134 on the last five channel activity level 130 measurements is merely one example on how to determine the channel activity level moving average 134. In other implementations, the channel activity level moving average 134 can be based on a different number of consecutive channel activity level 130 measurements or can be based on non-consecutive channel activity level 130 measurements.

In some implementations, the channel activity level moving average 134 for a particular channel 106 can correspond to a weighted moving average. For example, when determining the channel activity level moving average 134, a most current channel activity level 130 measurement can be assigned a first weight, a second most current channel activity level 130 measurement can be assigned a second weight, a third most current channel activity level 130 measurement can be assigned a third weight etc. In these implementations, the first weight is greater than the second weight, the second weight is greater than the third weight, etc. Thus, in these implementations, the channel activity level moving average 134 is more indicative of the recent channel activity level 130 measurements.

The channel evaluation unit 124 can be configured to determine whether the channel activity level 130A (or the channel activity level moving average 134A) satisfies a threshold activity level 136. For example, the channel evaluation unit 124 can determine whether the channel activity level 130A (or the channel activity level moving average 134A) is above the threshold activity level 136. The threshold activity level 136 can correspond to a programmable level that is indicative of noise on a channel. As a non-limiting example, and as further described with respect to FIG. 3, the threshold activity level 136 can be equal to −40 decibels (dB). The channel evaluation unit 124 can determine whether there is sustained noise over −40 dB on the channel 106A by comparing the channel activity level moving average 134A to the threshold activity level 136. The channel evaluation unit 124 can determine whether there is current noise over −40 dB on the channel 106A by comparing the latest channel activity level 130A measurement to the threshold activity level 136. It should be understood that −40 dB is merely used for illustrative purposes and should not be construed as limiting. In other implementations, the threshold activity level 136 can have a different value.

The channel selector 126 can be configured to switch the hub station 102 to a different channel 106B, 106C to communicate with the low-energy devices 104, at least in part, in response to determining that the channel activity level 130A (or the channel activity level moving average 134A) satisfies the threshold activity level 136. As used herein, "switching" to a particular channel corresponds to tuning the transceiver 114 to a frequency associated with the particular channel to enable the transceiver 114 to send and receive data using the particular channel. According to one implementation, if the channel evaluation unit 124 determines that the channel activity level 130A (or the channel activity level moving average 134A) associated with the channel 106A satisfies the threshold activity level 136 and the channel activity level 130B (or the channel activity level moving average 134B) associated with the channel 106B fails to satisfy the threshold activity level 136, the hub station 102 can switch to the channel 106B to communicate with the low-energy devices 104.

According to another implementation, if the channel evaluation unit 124 determines that the channel activity level 130A (or the channel activity level moving average 134A) associated with the channel 106A satisfies the threshold activity level 136 and the channel activity level 130B (or the channel activity level moving average 134B) associated with the channel 106B is less than the channel activity level 130A (or the channel activity level moving average 134A), the hub station 102 can switch to the channel 106B to communicate with the low-energy devices 104. In this implementation, channel selector 126 can select the channel 106B with less noise (e.g., less jamming activity), even if the channel 106B with less noise has a channel activity level 130B above the threshold activity level 136.

Although the above examples describe switching from the channel 106A to the channel 106B, it should be understood that the techniques described herein are not limited to switching between the channels 106A, 106B. In other implementations, the hub station 102 can switch from the channel 106A to the channel 106C if the channel activity level 130C (or the channel activity moving average 134B) associated with the channel 106C is below the threshold activity level 136 or below the channel activity level 130A associated with the channel 106A. In some scenarios, the hub station 102 can switch from the channel 106A to whichever channel 106B, 106C has a lower channel activity level 130 (or channel activity level moving average 134). For example, if the channel evaluation unit 124 determines that the channel activity level 130B associated with the channel 106B is less than the channel activity level 130C associated with the channel 106C, the hub station 102 can switch to the channel 106C in response to determining that the channel activity level 130A (or the channel activity level moving average 134A) satisfies the threshold activity level 136. However, if the channel evaluation unit 124 determines that the channel activity level 130C associated with the channel 106C is less than the channel activity level 130B associated with the channel 106B, the hub station 102 can switch to the channel 106B.

For ease of explanation, unless otherwise noted, the following description is based on the assumption that the hub station 102 switched from the primary channel 106A to the channel 106B. In response to switching to the channel 106B, the hub station 102 bypasses sending a notification to the low-energy devices 104 that the hub station 102 switched to the channel 106B. Thus, when the hub station 102 switches to the channel 106B, the low-energy devices 104 continue to use the channel 106A in an attempt to communicate with the hub station 102. As described below, the low-energy devices 104 are notified of the hub station's 102 switch from the primary channel 106A to the channel 106B by receiving an acknowledgment message 170 on the channel 106B in response to sending a message to the hub station 102 on the channel 106B. The acknowledgment message 170 can be generated by the message generator 128.

The low-energy devices 104 can correspond to any device that can enter into a low-energy mode. A non-limiting example of a low-energy device 104 is a motion sensor. When no motion is detected, the low-energy device 104 can operate in the low-energy mode. However, upon motion detection, the low-energy device 104 can transition from the low-energy mode into a normal operating mode.

The low-energy device 104A includes a sensor unit 150A, a processor 152A, and a transceiver 154A. According to one implementation, the sensor unit 150A can correspond to a motion detection module that is operable to detect motion. For example, the sensor unit 150B can include a camera and an image processor that are usable to detect motion in a field of view of the camera. In response to detecting motion, the processor 152A can transition into a normal operating mode and a message generator 160A within the processor 152A can generate a message 164A indicating that motion has been detected. The transceiver 154A can be configured to send the message 164A to the hub station 102 using one of the channels 106. Thus, the low-energy device 104A can remain in an idle state (e.g., the low-energy mode) absent detection of a wake-up event (e.g., motion detection), and the message 164A can be sent to the hub station 102 in response to the wake-up event.

It should be understood that motion detection is merely an example of a wake-up event that triggers transmission of a message 164A to the hub station 102. In other implementations, the low-energy device 104A can send a message 164A to the hub station 102 in response to other wake-up events. As a non-limiting example, the low-energy device 104A can correspond to an entry sensor and the wake-up event can correspond to detection of someone entering a premises (e.g., a home premises). As another non-limiting example, the low-energy device 104A can correspond to a keypad and the wake-up event can correspond to compression of a key.

As described above, the hub station 102 switched from the primary channel 106A to the channel 106B without notifying the low-energy device 104A. Thus, the transceiver 154A of the low-energy device 104A remains tuned to the primary channel 106A and sends the message 164A to the hub station 102 using the primary channel 106A. Because the hub station 102 has switched to the channel 106B, the hub station 102 will not receive the message 164A sent from the low-energy device 104A using the primary channel 106A, and thus, will not send the acknowledgement message 170 to the low-energy device 104A. As a result, the low-energy device's 104A attempt to send the message 164A to the hub station 102 on the primary channel 106A is unsuccessful. An unsuccessful attempt to send the message 164A to the hub station 102 on the primary channel 106A occurs when the low-energy device 104A fails to receive the acknowledgement message 170 from the hub station 102 on the primary channel 106A.

In some scenarios, the low-energy device 104A can switch from the primary channel 106A to another channel 106B, 106C after one unsuccessful attempt to send the message 164A to the hub station 102 on the primary channel 106A. In other scenarios, the low-energy device 104A can switch from the primary channel 106A to another channel 106B, 106C after two or more unsuccessful attempts to send the message 164A to the hub station 102 on the primary channel 106A.

The low-energy device 104A can select another channel 106B, 106C on which to send the message 164A to the hub station 102 after the unsuccessful attempt(s) to send the message 164A on the primary channel 106A. In some scenarios, the low-energy device 104A can select the other channel 106B, 106C at random. In other scenarios, the low-energy device 104A can select the channel 106B, 106C that is closer (in frequency) to the primary channel 106A. In other scenarios, the low-energy device 104A can select the channel 106B, 106C according to a hierarchy. For example, if the channel 106B is more compatible with communications between the low-energy device 104A and the hub station 102 than the channel 106C, the low-energy device 104A can select the channel 106B after the unsuccessful attempt(s) to send the message 164A on the primary channel 106A. For ease of illustration, let's assume that the low-energy device 104A selected the channel 106B (e.g., the channel on which the hub station 102 switched).

After switching to the channel 106B, the low-energy device 104A can send the message 164A to the hub station 102 using the channel 106B. Because the hub station 102 switched to the channel 102B, the hub station 102 can receive the message 164A from the low-energy device 104A on the channel 106B. In response to receiving the message 164A from the low-energy device 104A on the channel 106B, the hub station 102 can be configured to notify the low-energy device 104A that the hub station 102 switched to the channel 106B by sending the acknowledgment message 170 to the low-energy device 104A on the channel 106B. Once the low-energy device 104 receives the acknowledgment message 170 on the channel 106B, the attempt to send the message 164A to the hub station 102 is determined to be successful at the low-energy device 104A. As a result, the low-energy device 104A will send messages to the hub station 102 on the channel 106B going forward (e.g., until the low-energy device 104A experiences one or more unsuccessful attempts to send a message to the hub station 102 on the channel 106B).

The low-energy device 104B includes a sensor unit 150B, a processor 152B, and a transceiver 154B. The low-energy device 104B can operate in a substantially similar manner as the low-energy device 104A. For example, the sensor unit 150B can detect motion, and, in response to detecting the motion, the processor 152B can transition into a normal operating mode. A message generator 160B within the processor 152B can generate a message 164B indicating that motion has been detected. The transceiver 154B can be configured to send the message 164 to the hub station 102 using one of the channels 106. In a similar manner as described above, if the low-energy device 104B fails to receive the acknowledgment message 170, the low-energy device 104B can switch channels and resend the message 164B on the different channel and wait to receive the acknowledgment message 170. Once the low-energy device 104B sends the message 164B on a particular channel and receives the acknowledgment message 170 on the same channel, the low-energy device 104B can remain on the channel to communicate with the hub station 102.

As described above, in some scenarios, the channel 106A can correspond to a primary channel that has a higher compatibility rating, associated with communications between the hub station 102 and the low-energy devices 104, than the other channels 106B, 106C. As a result, in some implementations, the hub station 102 may attempt to switch back to the primary channel 106A after switching to the channel 106B. For example, the channel activity monitor 120 can monitor the channel activity level 130A associated with the primary channel 106A after switching to the channel 106B. In response to determining that the channel activity level 130A fails to satisfy (e.g., is lower than) the threshold activity level 136, the channel selector 126 can switch back to the primary channel 106A to communicate with the low-energy devices 104. Alternatively, in response to determining that the channel activity level 130A is lower than the channel activity level 130B associated with the channel 106B, the channel selector 126 can switch back to the primary channel 106A to communicate with the low-energy devices 104.

The techniques described with respect to FIG. 1 provides the hub station 102 with the agility to quickly switch channels 106 without notifying the low-energy devices 104 of the switch. For example, the hub station 102 can monitor (e.g., listen on) the channels 106 to select a channel 106 that does not have consistent radio energy (e.g., jamming). After selecting the channel 106, instead of directly notifying the low-energy devices 104, the low-energy devices 104 will find the channel 106 (e.g., the frequency) to which the hub station 102 moved by sending messages to the hub station 102 on different channels and awaiting an acknowledgment message. Thus, if the hub station 102 frequently switches between multiple channels 106, battery power can be conserved at the low-energy devices 104 because the hub station 102 bypasses sending channel switching notifications to the low-energy devices 104, which would cause the low-energy devices to "wake-up". As a result, the low-energy devices 104 can remain in a low-energy mode until detecting a wake-up event.

III. Example Computing System

Figure 2:
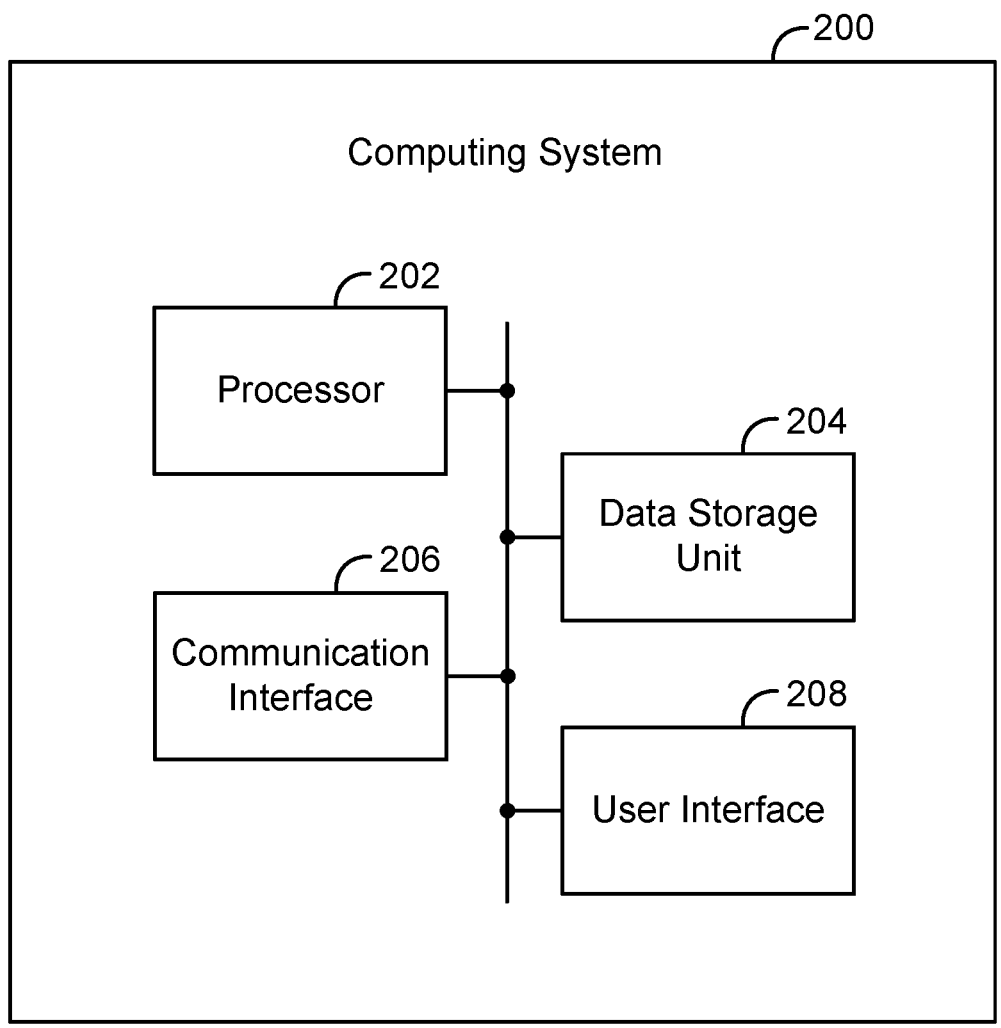
FIG. 2 is a simplified block diagram of an example computing system in which various described principles can be implemented.

FIG. 2 is a simplified block diagram of an example computing system 200. The computing system 200 can be configured to perform and/or can perform various operations, such as the operations described in this disclosure. The computing system 200 can include various components, such as a processor 202, a data storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data storage unit 204 as described below.

The data storage unit 204 can be or include one or more volatile, non-volatile, removable, and/or non-removable storage components, such as magnetic, optical, and/or flash storage, and/or can be integrated in whole or in part with the processor 202. Further, the data storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display screen (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, such as a partially or fully cloud-based arrangement, for instance.

The hub station 102 can take the form of a computing system, such as the computing system 200. In some cases, some or all of these entities can take the form of a more specific type of computing system.

IV. Example Energy Transmission Energy Levels

Figure 3:
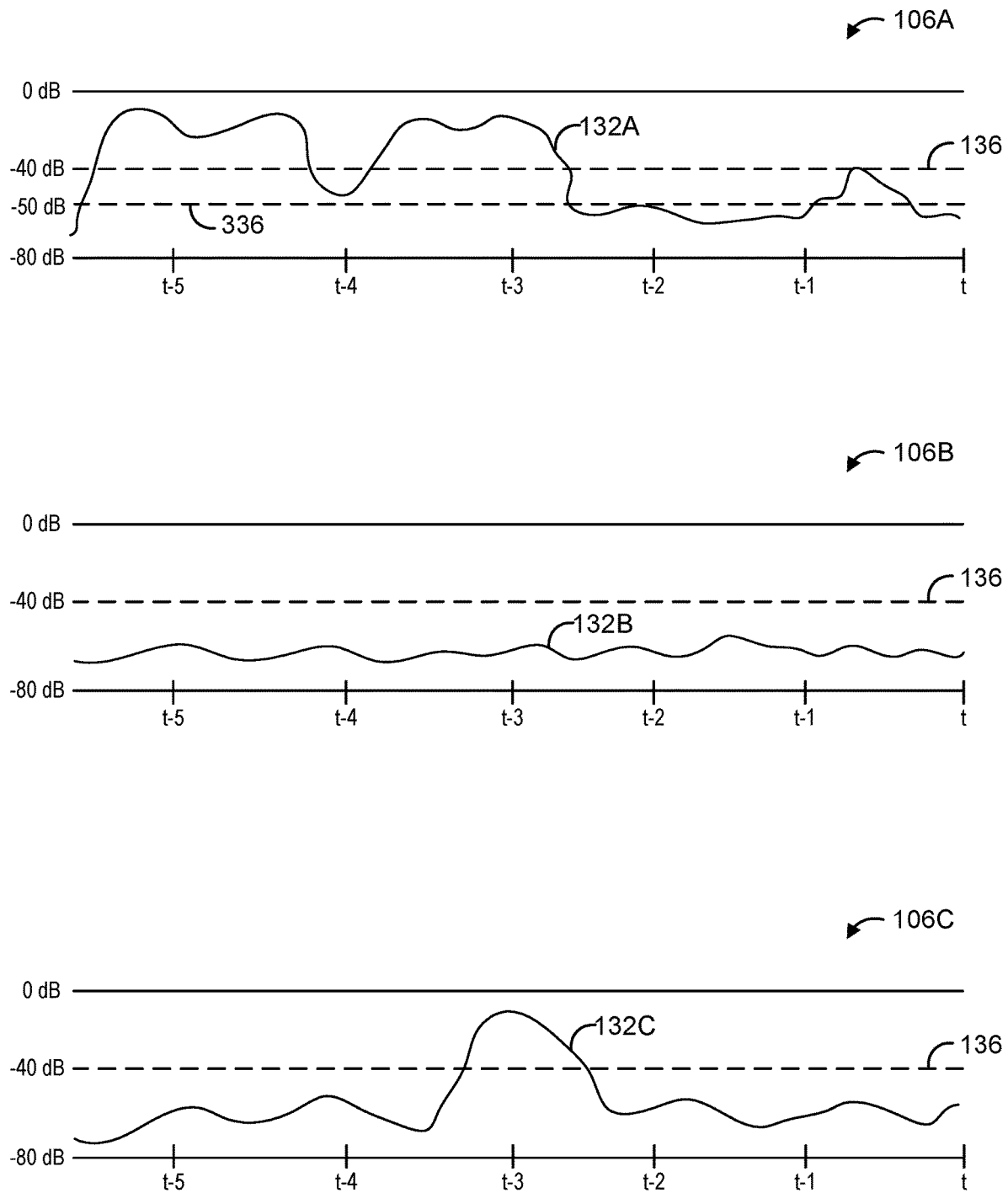
FIG. 3 depicts diagrams of example radio transmission energy levels on different channels.

FIG. 3 depicts diagrams of radio transmission energy levels on different channels. For example, in FIG. 3, the radio transmission energy levels 132 for each channel 106 are illustrated.

For each channel 106, the radio transmission levels 132 span between −80 dB and 0 dB. It should be understood that this range of radio transmission levels 132 is for illustrative purposes and should not be construed as limiting. In other implementations, the range for the radio transmission levels 132 can span lower than −80 dB, higher than 0 dB, or both. Additionally, in FIG. 3, the threshold activity level 136 is −40 dB. It should be understood that the threshold activity level 136 is for illustrative purposes and should not be construed as limiting. In other implementations, the threshold activity level 136 can be lower than −40 dB or higher than −40 dB. In some implementations, the threshold activity level 136 is programmable.

In other implementations, the threshold activity level 136 can be based on historical radio transmission levels 132. For example, historically, if radio transmission levels 132 on the channels 106 are consistently above −40 dB, the threshold activity level 136 can be raised to reduce the amount of times channel switching is initiated. However, historically, if radio transmission levels 132 on the channels 106 are consistently below −40 dB, the threshold activity level 136 can be lowered to increase the amount of times channel switching is initiated and ensure that the hub station 102 selects the channel 106 with the least amount of jamming activity.

Referring to the channel 106A in FIG. 3, the radio transmission energy 132A can be monitored and measured (e.g., recorded) at six different clock cycles. For example, the radio transmission energy 132A for the channel 106A is approximately −20 dB at clock cycle (t−5), the radio transmission energy 132A for the channel 106A is approximately −45 dB at clock cycle (t−4), the radio transmission energy 132A for the channel 106A is approximately −20 dB at clock cycle (t−3), the radio transmission energy 132A for the channel 106A is approximately −55 dB at clock cycle (t−2), the radio transmission energy 132A for the channel 106A is approximately −60 dB at clock cycle (t−1), and the radio transmission energy 132A for the channel 106A is approximately −60 dB at clock cycle (t). At clock cycle (t−1), the moving average of the radio transmission energy 132A for the last five clock cycles satisfies (e.g., is greater than) −40 dB. For example, the channel activity level moving average 134A is greater than the threshold activity level 136. As a result, the channel switching operation described with respect to FIG. 1 is initiated.

Referring to the channel 106B in FIG. 3, the radio transmission energy 132A can be monitored and measured (e.g., recorded) at six different clock cycles. For example, the radio transmission energy 132B for the channel 106B is approximately −60 dB at each clock cycle (t−5, t−4, t−3, t−2, t−1, and 5). Thus, at clock cycle (t−1), the moving average of the radio transmission energy 132B for the last five clock cycles satisfies (e.g., is less than) −40 dB. For example, the channel activity level moving average 134B is less than the threshold activity level 136. As a result, the channel 106B is a viable channel for the hub station 102 to select.

Referring to the channel 106C in FIG. 3, the radio transmission energy 132C can be monitored and measured (e.g., recorded) at six different clock cycles. For example, the radio transmission energy 132C for the channel 106C is approximately −60 dB at clock cycle (t−5), the radio transmission energy 132C for the channel 106C is approximately −50 dB at clock cycle (t−4), the radio transmission energy 132C for the channel 106C is approximately −10 dB at clock cycle (t−3), the radio transmission energy 132C for the channel 106C is approximately −50 dB at clock cycle (t−2), the radio transmission energy 132C for the channel 106C is approximately −60 dB at clock cycle (t−1), and the radio transmission energy 132C for the channel 106C is approximately −60 dB at clock cycle (t). Thus, at clock cycle (t−1), the moving average of the radio transmission energy 132C for the last five clock cycles satisfies (e.g., is less than) −40 dB. For example, the channel activity level moving average 134C is less than the threshold activity level 136. As a result, the channel 106C is a viable channel for the hub station 102 to select.

In one implementation, because both channels 106B, 106C are viable channels, the hub station 102 can select the channel with the lowest channel activity level moving average 134 (e.g., the channel 106B). In another implementation, because channels 106B, 106C are viable channels, the hub station 102 can select the channel that is most compatible with communications between the hub station 102 and the low-energy devices 104.

Additionally, referring to the channel 106A in FIG. 3, a return to primary channel threshold activity level 336 is depicted. For example, in FIG. 3, the threshold activity level 336 is −50 dB. It should be understood that the return to primary channel threshold activity level 336 is for illustrative purposes and should not be construed as limiting. In other implementations, the return to primary channel threshold activity level 336 can be different (e.g., lower or higher). After the hub station 102 switches to one of the other channels 106B, 106C in response to the radio transmission energy 132A for the channel 106A (or the channel activity level moving average 134A) raising above the threshold activity level 136, the hub station 102 can switch back to the channel 106A in response to the radio transmission energy 132A for the channel 106A (or the channel activity level moving average 134A) falling below the return to primary channel threshold activity level 336. Using the return to primary channel threshold activity level 336 to trigger the hub station 102 switching back to the channel 106A prevents frequent channel switching when the radio transmission energy 132A for the channel 106A (or the channel activity level moving average 134A) is near the threshold activity level 136.

V. Example Methods

Figure 4:
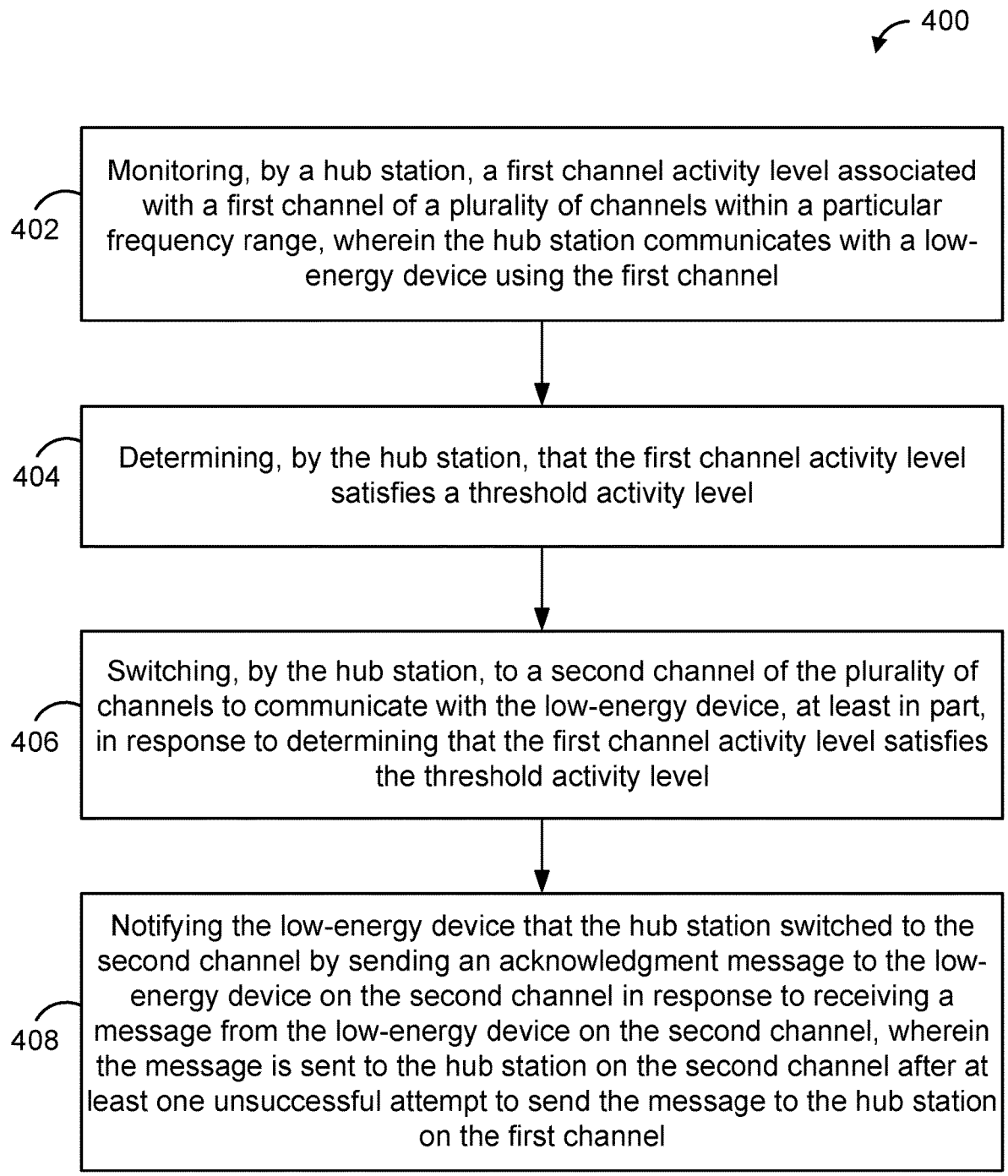
FIG. 4 is a flow chart of an example method.

FIG. 4 is a flow chart illustrating an example method 400. The method 400 can be carried out by a communication system, such as the communication system 100, or by a hub station, such as the hub station 102.

The method 400 includes monitoring, by a hub station, a first channel activity level associated with a first channel of a plurality of channels within a particular frequency range, at block 402. The hub station communicates with a low-energy device using the first channel. For example, referring to FIG. 1, the hub station 102 can monitor the channel activity level 130A associated with the channel 106A of the plurality of channels 106A, 106B, 106C within a particular frequency range. The hub station 102 communicates with the low-energy device 104A using the channel 106A.

The method 400 also includes determining, by the hub station, that the first channel activity level satisfies a threshold activity level, at block 404. For example, referring to FIG. 1, the hub station 102 determines that the channel activity level 130A satisfies (e.g., is greater than) the threshold activity level 136.

The method 400 also includes switching, by the hub station, to a second channel of the plurality of channels to communicate with the low-energy device, at least in part, in response to determining that the first channel activity level satisfies the threshold activity level, at block 406. For example, referring to FIG. 1, the hub station 102 switches to the second channel 106B of the plurality of channels 106A, 106B, 106C to communicate with the low-energy device 104A, at least in part, in response to determining that the channel activity level 130A satisfies (e.g., is greater than) the threshold activity level 136.

The method 400 also includes notifying the low-energy device that the hub station switched to the second channel by sending an acknowledgement message to the low-energy device on the second channel in response to receiving a message from the low-energy device on the second channel, at block 408. The message is sent to the hub station on the second channel after at least one unsuccessful attempt to send the message to the hub station on the first channel. For example, referring to FIG. 1, the hub station 102 notifies the low-energy device 104A that the hub station 102 switched to the channel 106B by sending the acknowledgement message 170 to the low-energy device 104A on the channel 106B in response to receiving the message 164A from the low-energy device 104A on the channel 106B. The message 164A is sent to the hub station 102 (from the low-energy device 104A) on the channel 106B after at least one unsuccessful attempt to send the message 164A to the hub station 102 on the channel 106A.

According to one implementation, the method 400 includes monitoring, by the hub station, a second channel activity level associated with the second channel. For example, referring to FIG. 1, the hub station 102 can monitor the channel activity level 130B associated with the channel 106B. The method 400 can also include determining, by the hub station, that the second channel activity level fails to satisfy the threshold activity level. For example, referring to FIG. 1, the hub station 102 can determine that the channel activity level 130B fails to satisfy (e.g., is less than or equal to) the threshold activity level. In this implementation, the hub station switches to the second channel in response to determining that the second channel activity level fails to satisfy the threshold activity level.

According to one implementation, the method 400 includes monitoring, by the hub station, a second channel activity level associated with the second channel. For example, referring to FIG. 1, the hub station 102 can monitor the channel activity level 130B associated with the channel 106B. The method 400 can also include determining, by the hub station, that the second channel activity level is lower than the first channel activity level. For example, referring to FIG. 1, the hub station 102 can determine that the channel activity level 130B is lower than the channel activity level 130A. In this implementation, the hub station switches to the second channel in response to determining that the second channel activity level is lower than the first channel activity level.

According to one implementation of the method 400, the first channel activity level corresponds to a level of radio transmission energy on the first channel. According to one implementation of the method 400, the first channel activity level corresponds to a moving average of channel activity levels on the first channel. The moving average of channel activity levels can be based on channel activity level measurements on the first channel for five consecutive clock cycles.

According to one implementation of the method 400, the low-energy device remains in an idle state absent detection of a wake-up event. The message can be sent to the hub station, from the low-energy device, in response to the wake-up event. According to one implementation of the method 400, the low-energy device corresponds to a motion sensor. According to other implementations of the method 400, the low-energy device corresponds to a keypad or an entry sensor.

According to one implementation of the method 400, an unsuccessful attempt to send the message to the hub station on the first channel occurs when the low-energy device fails to receive the acknowledgment message from the hub station on the first channel. According to one implementation of the method 400, the message is sent to the hub station on the second channel after two unsuccessful attempts, by the low-energy device, to send the message to the hub station on the first channel. For example, the hub station may monitor radio transmission energy levels on the different channels during a brief monitoring period. During the monitoring period, the low-energy device may wake up and attempt to send a message to the hub station on the first channel (e.g., a primary channel). Because the hub station is monitoring radio transmission energy levels on different channels, the attempt may be unsuccessful. As a result of the unsuccessful attempt, the hub station may lose the message transmitted by the low-energy device. The low-energy device can retransmit the message after an acknowledgement period. After the monitoring period, the hub station can return to normal operation on the first channel, receive the retransmitted message from the low-energy device, and send an acknowledgement to the low-energy device. Thus, to ensure that message is not lost, the acknowledgment period is greater than the monitoring period.

According to one implementation of the method 400, the hub station bypasses, in response to switching to the second channel, sending a notification to the low-energy device that the hub station switched to the second channel. According to one implementation of the method 400, the low-energy device sends messages to the hub station on the second channel after receiving the acknowledgment message.

According to one implementation, the method 400 includes monitoring, by the hub station, the first channel activity level after switching to the second channel. For example, referring to FIG. 1, the hub station 102 can monitor the channel activity level 130A after switching to the channel 106B. The method 400 can also include switching back to the first channel to communicate with the low-energy device in response to determining that the first channel activity level is lower than a second channel activity level associated with the second channel. For example, referring to FIG. 1, the hub station 102 can switch back to the channel 106A to communicate with the low-energy device 104A in response to determining that the channel activity level 130A is lower than the channel activity level 130B associated with the channel 106B.

According to one implementation, the method 400 includes monitoring, by the hub station, the first channel activity level after switching to the second channel. For example, referring to FIG. 1, the hub station 102 can monitor the channel activity level 130A after switching to the channel 106B. The method 400 can also include switching back to the first channel to communicate with the low-energy device in response to determining that the first channel activity level fails to satisfy the threshold activity level. For example, referring to FIG. 1, the hub station 102 can switch back to the channel 106A to communicate with the low-energy device 104A in response to determining that the channel activity level 130A fails to satisfy (e.g., is less than or equal to) the threshold activity level 136. In this implementation, the first channel is a primary channel that has a higher compatibility rating, associated with communications between the hub station and the low-energy device, than the second channel.

According to one implementation of the method 400, the plurality of channels includes the first channel, the second channel, and at least one other channel. The hub station is configurable to communicate with the low-energy device using any channel in the plurality of channels. According to one implementation, when the hub station monitors the first channel activity level, channel activity levels associated with other channels of the plurality of channels are unmonitored by the hub station. According to one implementation of the method 400, the particular frequency range correspond to a frequency range under one gigahertz (GHz). According to one implementation of the method 400, the threshold activity level is programmable.

The method 400 of FIG. 4 provides the hub station 102 with the agility to quickly switch channels 106 without notifying the low-energy devices 104 of the switch. For example, the hub station 102 can monitor (e.g., listen on) the channels 106 to select a channel 106 that does not have consistent radio energy (e.g., jamming). After selecting the channel 106, instead of directly notifying the low-energy devices 104, the low-energy devices 104 will find the channel 106 (e.g., the frequency) to which the hub station 102 moved by sending messages to the hub station 102 on different channels and awaiting an acknowledgment message. Thus, if the hub station 102 frequently switches between multiple channels 106, battery power can be conserved at the low-energy devices 104 because the hub station 102 bypasses sending channel switching notifications to the low-energy devices 104, which would cause the low-energy devices to "wake-up". As a result, the low-energy devices 104 can remain in a low-energy mode until detecting a wake-up event.

Figure 5:
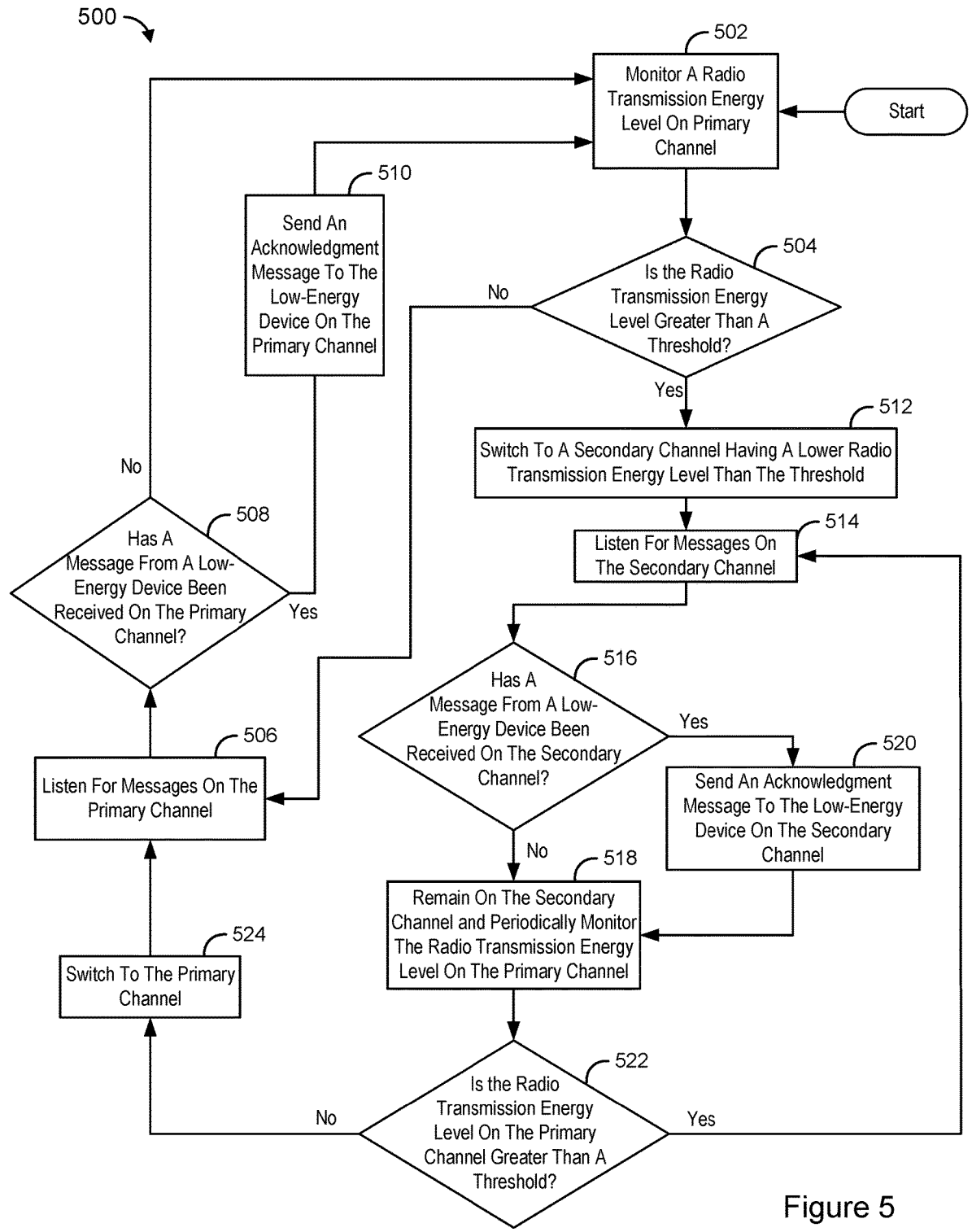
FIG. 5 is a flow chart of another example method.
Figure 6:
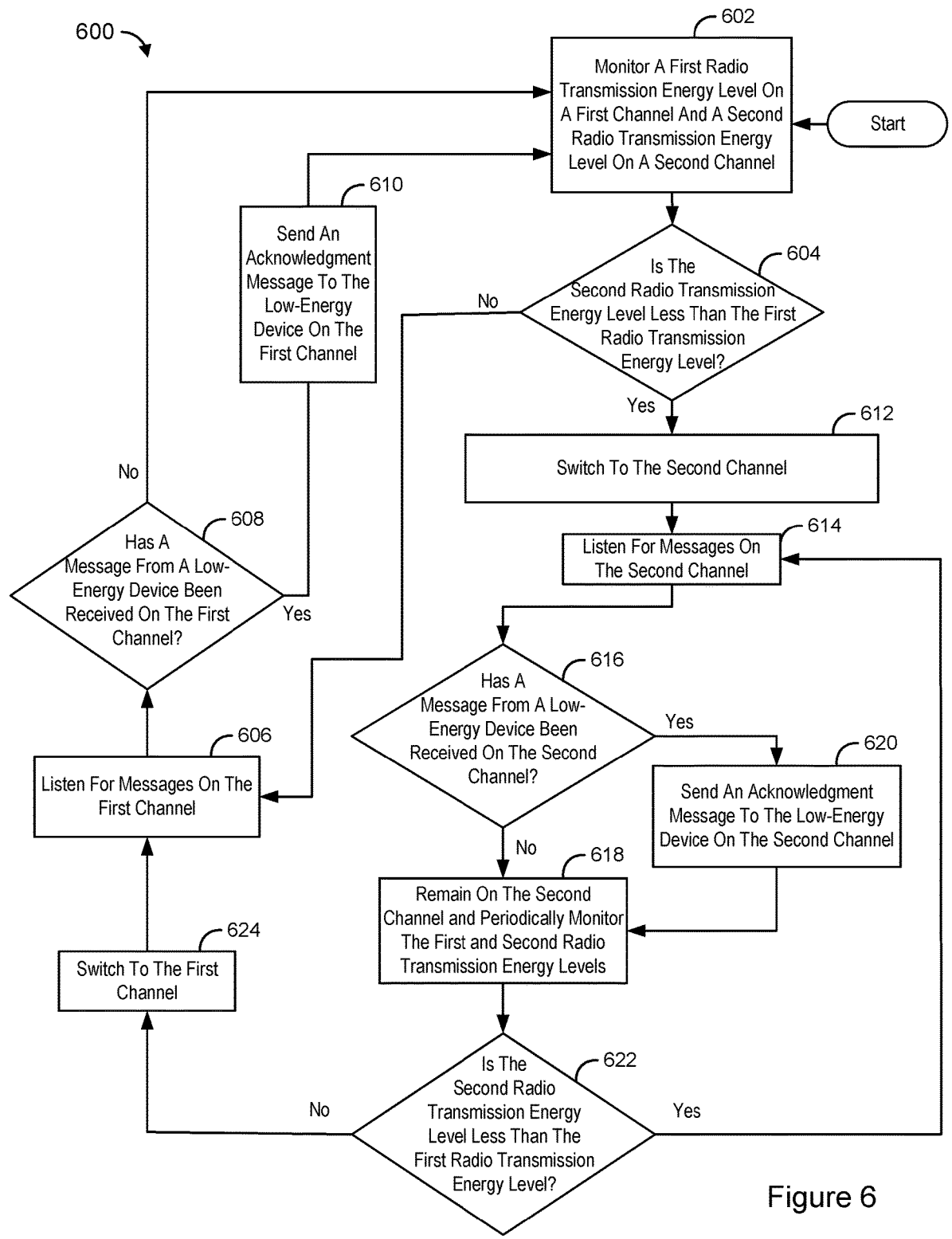
FIG. 6 is a flow chart of another example method.

Additional methods 500, 600 are disclosed with respect to FIGS. 5 and 6. According to the method 500 of FIG. 5, the hub station 102 listen for messages on the primary channel 106A if radio transmission energy 132A on the primary channel 106A is less than a threshold level. Thus, according to the method 500 of FIG. 5, if the radio transmission energy 132A on the primary channel is below a threshold level, the hub station 102 listens for messages on the primary channel 106A regardless of whether the radio transmission energy 132B on the secondary channel 106B is less than the radio transmission energy 132A on the primary channel 106A. It may be beneficial to switch to the primary channel 106A because the primary channel 106A may have a higher compatibility rating, associated with communications between the hub station 102 and the low-energy devices 104, than the secondary channel 106B.

However, according to the method 600 of FIG. 6, the hub station 102 listens for messages on whichever channel 106 has the lowest radio transmission energy 132. Thus, according to the method 600 of FIG. 6, one channel 106A may not present improved compatibility than the other channel 106B. As a result, it may be beneficial to switch to whichever channel 106 has the lowest radio transmission energy 132.

FIG. 5 is a flow chart illustrating another example method 500. The method 500 can be carried out by a communication system, such as the communication system 100, or by a hub station, such as the hub station 102.

According to the method 500, at block 502, a hub station monitors a radio transmission energy level on a primary channel. For example, referring to FIG. 1, the hub station 102 monitors the radio transmission energy 132A on the channel 106A.

At decision block 504, the hub station determines if the radio transmission energy level on the primary channel greater than a threshold. For example, referring to FIG. 1, the hub station 102 determines whether the radio transmission energy 132A on the channel 106A is greater than the threshold activity level 136.

If the radio transmission energy level on the primary channel is not greater than the threshold, at decision block 504, the method 500 moves to block 506. At block 506, the hub station listens for messages on the primary channel. For example, referring to FIG. 1, the hub station 102 listens for messages 164 from the low-energy devices 104 on the channel 106A.

At decision block 508, the hub station determines whether a message from a low-energy device been received on the primary channel. For example, referring to FIG. 1, hub station 102 determines whether a message 164 has been received from one of the low-energy devices 104 on the channel 106A.

If a message from the low-energy device has not been received on the primary channel, at decision block 508, the method 500 moves back to block 502. However, if a message from the low-energy device has been received on the primary channel, at decision block 508, the method 500 moves to block 510. At block 510, the hub station sends an acknowledgment message to the low-energy device on the primary channel. For example, referring to FIG. 1, if the message 164A from the low-energy device 104A has been received by the hub station 102 on the channel 106A, the hub station 102 sends the acknowledgment message 170 to the low-energy device 104A on the channel 106A. After sending the acknowledgment message, at block 510, the method 500 moves back to block 502.

If the radio transmission energy level on the primary channel is greater than the threshold, at decision block 504, the method 500 moves to block 512. At block 512, the hub station switches to a secondary channel having a lower radio transmission energy level than the threshold. For example, referring to FIG. 1, the hub station 102 switches to the channel 106B (assuming that the radio transmission energy 132B on the channel 106B is lower than the threshold activity level 136).

At block 514, the hub station listens for messages on the secondary channel. For example, referring to FIG. 1, the hub station 102 listens for messages 164 from the low-energy devices 104 on the channel 106B.

At decision block 516, the hub station determines whether a message from a low-energy device been received on the secondary channel. For example, referring to FIG. 1, the hub station 102 determines whether a message 164 has been received from one of the low-energy devices 104 on the channel 106B.

If a message from the low-energy device has not been received on the secondary channel, at decision block 516, the method 500 moves to block 518. At block 518, the hub station remains on the secondary channel and periodically monitors the radio transmission energy level on the primary channel. For example, referring to FIG. 1, the hub station 102 remains on the channel 106B and periodically monitors the radio transmission energy 132A on the channel 106A.

However, if a message from the low-energy device has been received on the secondary channel, at decision block 516, the method 500 moves to block 520. At block 520, the hub station sends an acknowledgment message to the low-energy device on the secondary channel. For example, referring to FIG. 1, if the message 164A from the low-energy device 104A has been received by the hub station 102 on the channel 106B, the hub station 102 sends the acknowledgment message 170 to the low-energy device 104A on the channel 106B. After sending the acknowledgment message, at block 520, the method 500 moves to block 518.

At decision block 522, the hub station determines if the radio transmission energy level on the primary channel greater than a threshold. For example, referring to FIG. 1, the hub station 102 determines whether the radio transmission energy 132A on the channel 106A is greater than the threshold activity level 136.

If the radio transmission energy level on the primary channel is not greater than the threshold, at decision block 522, the method 500 moves to block 524. At block 524, the hub station switches to the primary channel. For example, referring to FIG. 1, the hub station 102 switches back to the channel 106A. After the hub station switches back to the primary channel, at block 524, the method 500 moves back to block 506. If the radio transmission energy level on the primary channel is greater than the threshold, at decision block 522, the method 500 moves to block 514.

The method 500 of FIG. 5 provides the hub station 102 with the agility to quickly switch from a primary channel 106A to a secondary channel 106B based on whether the primary channel 106A has consistent radio energy (e.g., jamming). Thus, according to the method 500 of FIG. 5, hub station 102 reverts back to the primary channel 106A if the radio energy on the primary channel 106A is less than a threshold, regardless of whether the secondary channel 106B has less radio energy than the primary channel 106A. It may be beneficial to switch (e.g., revert back) to the primary channel 106A because the primary channel 106A may have a higher compatibility rating, associated with communications between the hub station 102 and the low-energy devices 104, than the secondary channel 106B.

FIG. 6 is a flow chart illustrating another example method 600. The method 600 can be carried out by a communication system, such as the communication system 100, or by a hub station, such as the hub station 102.

According to the method 600, at block 602, a hub station monitors a first radio transmission energy level on a first channel and a second radio transmission energy level on a second channel. For example, referring to FIG. 1, the hub station 102 monitors the radio transmission energy 132A on the channel 106A and the radio transmission energy level 132B on the channel 106B.

At decision block 604, the hub station determines if the second radio transmission energy level is less than the first radio transmission energy level. For example, referring to FIG. 1, the hub station 102 determines whether the radio transmission energy 132B is less than the radio transmission energy 132A.

If the second radio transmission energy level on the second channel is not less than the first radio transmission energy level on the first channel, at decision block 604, the method 600 moves to block 606. At block 606, the hub station listens for messages on the first channel. For example, referring to FIG. 1, the hub station 102 listens for messages 164 from the low-energy devices 104 on the channel 106A.

At decision block 608, the hub station determines whether a message from a low-energy device been received on the first channel. For example, referring to FIG. 1, hub station 102 determines whether a message 164 has been received from one of the low-energy devices 104 on the channel 106A.

If a message from the low-energy device has not been received on the first channel, at decision block 608, the method 600 moves back to block 602. However, if a message from the low-energy device has been received on the first channel, at decision block 608, the method 600 moves to block 610. At block 610, the hub station sends an acknowledgment message to the low-energy device on the first channel. For example, referring to FIG. 1, if the message 164A from the low-energy device 104A has been received by the hub station 102 on the channel 106A, the hub station 102 sends the acknowledgment message 170 to the low-energy device 104A on the channel 106A. After sending the acknowledgment message, at block 610, the method 600 moves back to block 602.

If the second radio transmission energy level on the second channel is less than the first radio transmission energy level on the first channel, at decision block 604, the method 600 moves to block 612. At block 612, the hub station switches to a second channel. For example, referring to FIG. 1, the hub station 102 switches to the channel 106B.

At block 614, the hub station listens for messages on the second channel. For example, referring to FIG. 1, the hub station 102 listens for messages 164 from the low-energy devices 104 on the channel 106B.

At decision block 616, the hub station determines whether a message from a low-energy device been received on the second channel. For example, referring to FIG. 1, the hub station 102 determines whether a message 164 has been received from one of the low-energy devices 104 on the channel 106B.

If a message from the low-energy device has not been received on the second channel, at decision block 616, the method 600 moves to block 618. At block 618, the hub station remains on the second channel and periodically monitors the first and second radio transmission energy levels. For example, referring to FIG. 1, the hub station 102 remains on the channel 106B and periodically monitors the radio transmission energy 132A on the channel 106A and the radio transmission energy 132B on the channel 106B.

However, if a message from the low-energy device has been received on the second channel, at decision block 616, the method 600 moves to block 620. At block 620, the hub station sends an acknowledgment message to the low-energy device on the second channel. For example, referring to FIG. 1, if the message 164A from the low-energy device 104A has been received by the hub station 102 on the channel 106B, the hub station 102 sends the acknowledgment message 170 to the low-energy device 104A on the channel 106B. After sending the acknowledgment message, at block 620, the method 600 moves to block 618.

At decision block 622, the hub station determines if the second radio transmission energy level is less than the first radio transmission energy level. For example, referring to FIG. 1, the hub station 102 determines whether the radio transmission energy 132B is less than the radio transmission energy 132A.

If the second radio transmission energy level on the second channel is not less than the first radio transmission energy level, at decision block 622, the method 600 moves to block 624. At block 624, the hub station switches to the first channel. For example, referring to FIG. 1, the hub station 102 switches back to the channel 106A. After the hub station switches back to the first channel, at block 624, the method 600 moves back to block 606. If the second radio transmission energy level is less than the first radio transmission energy level, at decision block 622, the method 600 moves to block 614.

The method 600 of FIG. 6 provides the hub station 102 with the agility to quickly switch from a first channel 106A to a second channel 106B based on whether the first channel 106A has consistent radio energy (e.g., jamming). According to the method 600 of FIG. 6, the hub station 102 listens for messages on whichever channel 106 has the lowest radio transmission energy 132 because one channel 106A may not present improved compatibility than the other channel 106B. As a result, it may be beneficial to switch to whichever channel 106 has the lowest radio transmission energy 132.

Figure 7:
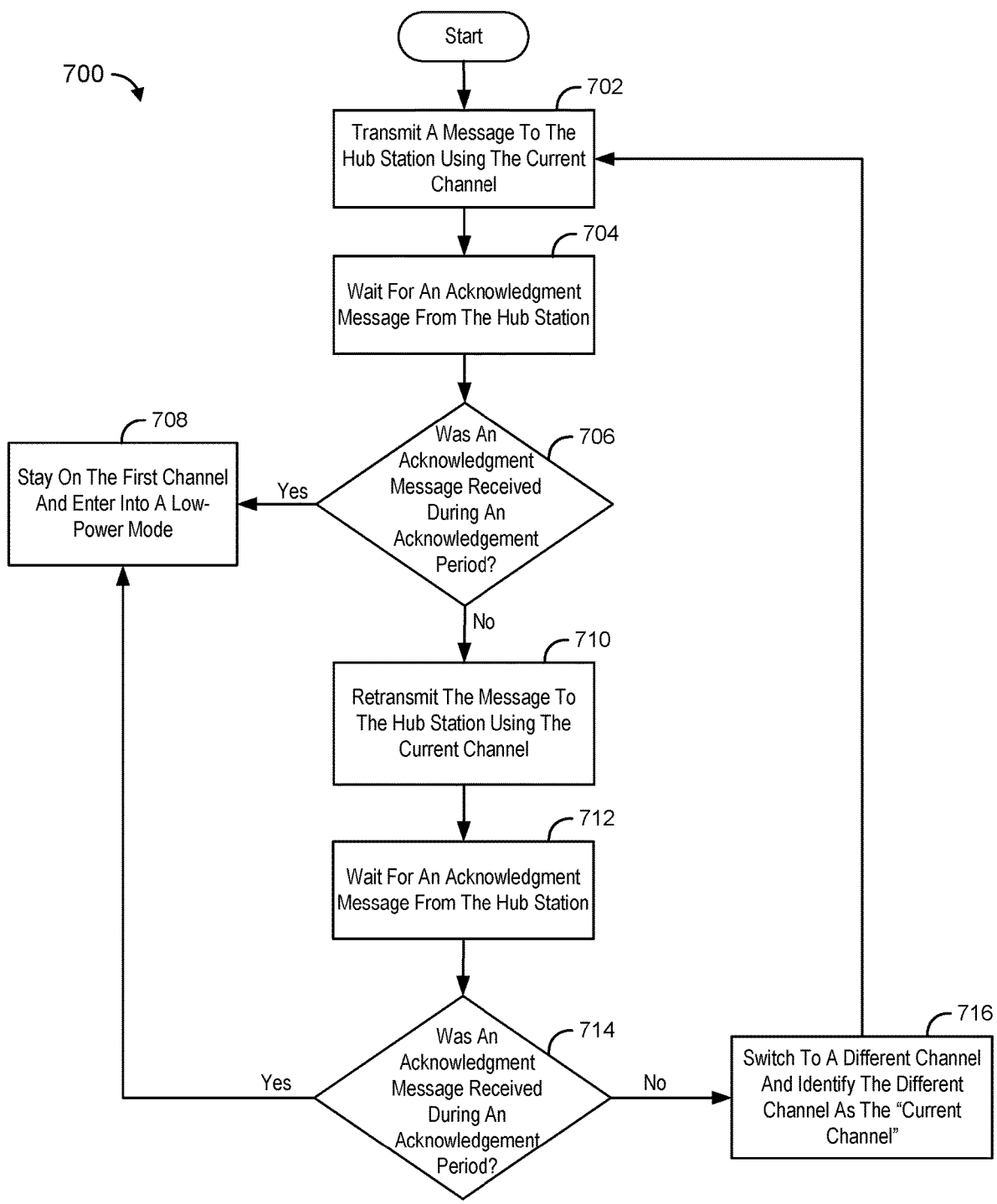
FIG. 7 is a flow chart of another example method.

FIG. 7 is a flow chart illustrating another example method 700. The method 700 can be carried out by a communication system, such as the communication system 100, or by a low-energy device, such as the low-energy device 104A or the low-energy device 104B.

According to the method 700, at block 702, a low-energy device transmits a message to a hub station using a current channel. For example, referring to FIG. 1, the low-energy device 104A transmits the message 164A to the hub station 102 using the channel 106A.

At block 704, the low-energy device waits for an acknowledgment message from the hub station. For example, referring to FIG. 1, the low-energy device 104A waits for the acknowledgment message 170 from the hub station 102 in response to sending the message 164A.

At decision block 706, the low-energy device determines whether the acknowledgment message was receiving during an acknowledgment period. For example, referring to FIG. 1, the low-energy device 104A determines whether the acknowledgment message 170 was received from the hub station 102 during a time period (e.g., an acknowledgment period) after transmitting the message 164A. If the acknowledgment message was received during the acknowledgment period, at decision block 706, the method 700 continues to block 708. At block 708, the low-energy device stays on the current channel and enters into a low-power mode. However, if the acknowledgement message was not received during the acknowledgment period, at block 710, the method 700 continues to block 710.

At block 710, the low-energy device transmits a message to a hub station using a current channel. For example, referring to FIG. 1, the low-energy device 104A retransmits the message 164A to the hub station 102 using the channel 106A.

At block 712, the low-energy device waits for an acknowledgment message for the retransmitted message from the hub station. For example, referring to FIG. 1, the low-energy device 104A waits for the acknowledgment message 170 from the hub station 102 in response to sending the message 164A.

At decision block 714, the low-energy device determines whether the acknowledgment message for the retransmitted message was receiving during an acknowledgment period. For example, referring to FIG. 1, the low-energy device 104A determines whether the acknowledgment message 170 was received from the hub station 102 during a time period (e.g., an acknowledgment period) after retransmitting the message 164A. If the acknowledgment message was received during the acknowledgment period, at decision block 714, the method 700 continues to block 708. However, if the acknowledgement message was not received during the acknowledgment period, at block 714, the method 700 continues to block 716.

At block 716, the low-energy device switches to a different channel and different channel becomes the new "current channel". For example, referring to FIG. 1, the low-energy device 104A switches to the channel 106B and the channel 106B becomes the new current channel (e.g., the channel that the low-energy device 104A uses to communicate with the hub station 102). After switching, at block 716, the method 700 returns to block 702 and the low-energy device transmits the message to the hub station using the new current channel.

VI. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
monitoring, by a hub station, a first channel activity level associated with a first channel of a plurality of channels within a particular frequency range, wherein the hub station communicates with a device using the first channel;
determining, by the hub station, that the first channel activity level satisfies a threshold activity level;
switching, by the hub station, to a second channel of the plurality of channels to communicate with the device, at least in part, in response to determining that the first channel activity level satisfies the threshold activity level; and
notifying the device that the hub station switched to the second channel by sending an acknowledgment message to the device on the second channel in response to receiving a message from the device on the second channel, wherein the message is sent to the hub station on the second channel after at least one unsuccessful attempt to send the message to the hub station on the first channel.

2. The method of claim 1, further comprising:
monitoring, by the hub station, a second channel activity level associated with the second channel; and
determining, by the hub station, that the second channel activity level fails to satisfy the threshold activity level, wherein the hub station switches to the second channel in response to determining that the second channel activity level fails to satisfy the threshold activity level.

3. The method of claim 1, further comprising:
monitoring, by the hub station, a second channel activity level associated with the second channel; and
determining, by the hub station, that the second channel activity level is lower than the first channel activity level,
wherein the hub station switches to the second channel in response to determining that the second channel activity level is lower than the first channel activity level.

4. The method of claim 1, wherein the first channel activity level corresponds to a level of radio transmission energy on the first channel.

5. The method of claim 1, wherein the first channel activity level corresponds to a moving average of channel activity levels on the first channel.

6. The method of claim 5, wherein the moving average of channel activity levels is based on channel activity level measurements on the first channel for five consecutive clock cycles.

7. The method of claim 1, wherein the device remains in an idle state absent detection of a wake-up event, and wherein the message is sent to the hub station, from the device, in response to the wake-up event.

8. The method of claim 1, wherein the device corresponds to a motion sensor.

9. The method of claim 1, wherein an unsuccessful attempt to send the message to the hub station on the first channel occurs when the device fails to receive the acknowledgment message from the hub station on the first channel.

10. The method of claim 1, wherein the message is sent to the hub station on the second channel after two unsuccessful attempts, by the device, to send the message to the hub station on the first channel.

11. The method of claim 1, wherein the hub station bypasses, in response to switching to the second channel, sending a notification to the device that the hub station switched to the second channel.

12. The method of claim 1, wherein the particular frequency range corresponds to a frequency range under one gigahertz (GHz).

13. The method of claim 1, wherein the threshold activity level is programmable.

14. The method of claim 1, further comprising:
monitoring, by the hub station, the first channel activity level after switching to the second channel; and
switching back to the first channel to communicate with the device in response to determining that the first channel activity level is lower than a second channel activity level associated with the second channel.

15. The method of claim 1, further comprising:
monitoring, by the hub station, the first channel activity level after switching to the second channel; and
switching back to the first channel to communicate with the device in response to determining that the first channel activity level fails to satisfy the threshold activity level, wherein the first channel is a primary channel that has a higher compatibility rating, associated with communications between the hub station and the device, than the second channel.

16. The method of claim 1, wherein the plurality of channels comprises the first channel, the second channel, and at least one other channel, and wherein the hub station is configurable to communicate with the device using any channel in the plurality of channels.

17. The method of claim 1, wherein, when the hub station monitors the first channel activity level, channel activity levels associated with other channels of the plurality of channels are unmonitored by the hub station.

18. The method of claim 1, wherein the device sends messages to the hub station on the second channel after receiving the acknowledgment message.

19. A hub station comprising:
- a memory; and
- a processor coupled to the memory, the processor configured to:
  - monitor a first channel activity level associated with a first channel of a plurality of channels within a particular frequency range, wherein the hub station communicates with a device using the first channel;
  - determine that the first channel activity level satisfies a threshold activity level;
  - switch to a second channel of the plurality of channels to communicate with the device, at least in part, in response to determining that the first channel activity level satisfies the threshold activity level; and
  - notify the device that the hub station switched to the second channel by sending an acknowledgment message to the device on the second channel in response to receiving a message from the device on the second channel, wherein the message is sent to the hub station on the second channel after at least one unsuccessful attempt to send the message to the hub station on the first channel.

20. A non-transitory computer-readable medium comprising instructions that, when executed by a processor within a hub station, causes the processor to perform operations comprising:
- monitoring a first channel activity level associated with a first channel of a plurality of channels within a particular frequency range, wherein the hub station communicates with a device using the first channel;
- determining that the first channel activity level satisfies a threshold activity level;
- switching to a second channel of the plurality of channels to communicate with the device, at least in part, in response to determining that the first channel activity level satisfies the threshold activity level; and
- notifying the device that the hub station switched to the second channel by sending an acknowledgment message to the device on the second channel in response to receiving a message from the device on the second channel, wherein the message is sent to the hub station on the second channel after at least one unsuccessful attempt to send the message to the hub station on the first channel.

* * * * *